United States Patent
Tomiyori et al.

(10) Patent No.: US 9,534,322 B2
(45) Date of Patent: Jan. 3, 2017

(54) FABRIC FOR CARBON FIBER REINFORCED COMPOSITE MATERIAL AND METHOD OF MANUFACTURING THE SAME

(71) Applicant: AYAHA CORPORATION, Osaka-shi, Osaka (JP)

(72) Inventors: Takayoshi Tomiyori, Osaka (JP); Kosuke Mitamura, Osaka (JP)

(73) Assignee: AYAHA CORPORATION, Osaka (JP)

( * ) Notice: Subject to any disclaimer, the term of this patent is extended or adjusted under 35 U.S.C. 154(b) by 0 days.

(21) Appl. No.: 14/433,737

(22) PCT Filed: Sep. 5, 2013

(86) PCT No.: PCT/JP2013/005259
§ 371 (c)(1),
(2) Date: Apr. 6, 2015

(87) PCT Pub. No.: WO2014/057606
PCT Pub. Date: Apr. 17, 2014

(65) Prior Publication Data
US 2015/0233028 A1 Aug. 20, 2015

(30) Foreign Application Priority Data

Oct. 10, 2012 (JP) ................................ 2012-224762

(51) Int. Cl.
*D03D 1/00* (2006.01)
*D03D 15/00* (2006.01)
(Continued)

(52) U.S. Cl.
CPC ............... *D03D 11/00* (2013.01); *B29B 11/16* (2013.01); *D03D 1/00* (2013.01); *D03D 15/00* (2013.01);
(Continued)

(58) Field of Classification Search
CPC ............. B29C 66/7212; B29C 66/7392; B29C 66/721; B29C 70/22; B29C 43/203; B32B 5/024; B32B 2262/106; B32B 2260/046; B32B 2260/023; B32B 2250/20; B32B 5/06; B32B 2305/076; B32B 2305/188; B32B 27/08; B32B 5/08; D03D 1/0052; D03D 15/00; D03D 13/004; D03D 15/12; D03D 13/008; D03D 1/00; D03D 11/00; D03D 25/00
See application file for complete search history.

(56) References Cited

U.S. PATENT DOCUMENTS 5,160,485 A 11/1992 Jaillet et al.
5,240,773 A * 8/1993 Dunn ........................ A61F 5/01
428/408
(Continued)

FOREIGN PATENT DOCUMENTS

CN 1255072 5/2000
CN 1584163 2/2005
(Continued)

OTHER PUBLICATIONS

International Search Report for PCT/JP2013/005259 dated Nov. 29, 2013.

*Primary Examiner* — Bobby Muromoto, Jr.
(74) *Attorney, Agent, or Firm* — Nicholas Trenkle; Stites & Harbison, PLLC (57) ABSTRACT

A method of manufacturing a fabric for a carbon fiber reinforced composite material includes binding a front texture woven with warp threads and weft threads which are carbon fibers and a back texture woven with warp threads and weft threads which are thermoplastic resin fibers at binding points to integrate the front texture and the back texture.

4 Claims, 9 Drawing Sheets

(51) Int. Cl.
- D03D 11/00 (2006.01)
- B29B 11/16 (2006.01)
- *B32B 5/02* (2006.01)
- *B29K 307/04* (2006.01)
- *B29K 301/12* (2006.01)

(52) U.S. Cl.
CPC ........ *B29K 2301/12* (2013.01); *B29K 2307/04* (2013.01); *D10B 2101/12* (2013.01); *D10B 2331/02* (2013.01); *D10B 2403/0114* (2013.01); *D10B 2505/02* (2013.01)

(56) References Cited

U.S. PATENT DOCUMENTS

| | | | |
|---|---|---|---|
| 5,633,074 A | 5/1997 | Muroi et al. | |
| 6,670,040 B1* | 12/2003 | Matsushita | C04B 35/83 428/145 |
| 7,138,345 B2* | 11/2006 | Wadahara | B29B 11/16 423/447.1 |
| 7,358,202 B2* | 4/2008 | Hartman | B32B 5/12 428/107 |
| 7,754,322 B2* | 7/2010 | Tilbrook | C08G 59/38 428/297.4 |
| 7,972,686 B2* | 7/2011 | Tilbrook | C08G 59/38 428/297.4 |
| 8,211,268 B1* | 7/2012 | Raghavendran | B29C 65/02 156/307.1 |
| 9,259,879 B2* | 2/2016 | Roman | D03D 13/004 |
| 9,321,539 B2* | 4/2016 | Briand | B64D 37/32 |
| 2004/0170554 A1* | 9/2004 | Wadahara | B29B 11/16 423/447.2 |
| 2004/0224590 A1* | 11/2004 | Rawa | B29C 70/088 442/176 |
| 2008/0286578 A1* | 11/2008 | Tilbrook | C08G 59/38 428/413 |
| 2010/0239755 A1* | 9/2010 | Tilbrook | C08G 59/38 427/221 |
| 2011/0034591 A1* | 2/2011 | Cawse | C08G 59/3227 523/400 |
| 2011/0147670 A1* | 6/2011 | Tilbrook | C08G 59/38 252/503 |
| 2011/0183562 A1* | 7/2011 | Carter | D02G 3/16 442/187 |
| 2011/0262630 A1* | 10/2011 | Tilbrook | C08G 59/38 427/121 |
| 2012/0006481 A1* | 1/2012 | Azami | C09J 5/06 156/306.6 |
| 2012/0094106 A1* | 4/2012 | Honma | B32B 5/10 428/299.1 |
| 2012/0251763 A1* | 10/2012 | Yamamoto | B29B 11/16 428/68 |
| 2012/0295504 A1* | 11/2012 | Miyauchi | B29C 70/46 442/179 |
| 2013/0330514 A1* | 12/2013 | Cawse | B32B 5/26 428/143 |
| 2014/0227474 A1 | 8/2014 | Cramer | |
| 2014/0329046 A1* | 11/2014 | Hirai | D03D 1/00 428/86 |
| 2014/0329429 A1* | 11/2014 | Eleazer | B32B 5/024 442/243 |
| 2015/0233028 A1* | 8/2015 | Tomiyori | D03D 11/00 139/413 |
| 2015/0240396 A1* | 8/2015 | Hayashi | B32B 37/04 442/202 |
| 2015/0252184 A1* | 9/2015 | Arai | C08J 5/24 523/434 |
| 2015/0274913 A1* | 10/2015 | Takemura | C08J 5/24 428/212 |
| 2015/0318558 A1* | 11/2015 | Kajiwara | H01M 4/8807 429/534 |
| 2015/0336333 A1* | 11/2015 | Bonner | B29C 70/465 442/202 |
| 2015/0336369 A1* | 11/2015 | Bae | C08J 5/24 156/179 |

FOREIGN PATENT DOCUMENTS

| | | |
|---|---|---|
| EP | 0 268 401 | 12/1994 |
| JP | 61-102452 | 5/1986 |
| JP | 03-069629 | 3/1991 |
| JP | H0369629 | 11/1991 |
| JP | 06-346337 | 12/1994 |
| JP | 07-018538 | 1/1995 |
| JP | 07-252372 | 10/1995 |
| JP | 08-142238 | 6/1996 |
| JP | 11-348191 | 12/1999 |
| JP | 3075581 | 2/2001 |
| JP | 2002-113802 | 4/2002 |
| JP | 2006-123417 | 5/2006 |

\* cited by examiner

FABRIC FOR CARBON FIBER REINFORCED COMPOSITE MATERIAL AND METHOD OF MANUFACTURING THE SAME

TECHNICAL FIELD

The present invention relates to a fabric for a carbon fiber reinforced composite material formed by carbon fibers and thermoplastic resin fibers and a method of manufacturing the same.

BACKGROUND ART

Carbon fibers have high tensile strength and a high tensile elastic modulus and carbon fiber reinforced plastic formed by solidifying the carbon fibers with resin is a material having high specific strength and a high specific elastic modulus. Therefore, the carbon fibers are widely used as an advanced composite material for aerospace use, use for automobiles, use for civil engineering and construction, use for sporting and leisure goods, and the like.

As a method of manufacturing the carbon fiber reinforced composite material by thermoplastic resin impregnation, there are various methods. For example, one of the methods is a known method in which prepreg impregnated with resin is stacked in a plurality of layers, a blank (stampable sheet) is formed by heating and laminate molding of the layers of prepreg, and a carbon fiber reinforced composite material is formed by reheating and hot press molding of the stampable sheet in a mold.

There is also a joined sheet which is manufactured by respectively disposing thermoplastic resin sheets on upper and lower faces of plain-woven carbon fibers and melting the thermoplastic resin sheets into the carbon fibers by heating and pressurizing the laminated body with hot plates from both sides (see Patent Document 1, for example).

There is also proposed a method of obtaining a carbon fiber reinforced composite material by weaving carbon fibers and thermoplastic resin fibers while blending them (see Patent Document 2, for example).

PRIOR ART DOCUMENTS

Patent Documents

Patent Document 1: Japanese Patent Laid-open Publication No. 11-348191
Patent Document 2: Japanese Patent Laid-open Publication No. 2006-123417

SUMMARY OF THE INVENTION

Problems to be Solved by the Invention

However, the above-described methods require complicated and time-consuming steps such as a step of forming the prepreg in advance and a pressure bonding step of the laminated plate.

There is also a problem of handling in molding of the carbon fiber reinforced plastic. For example, because the prepreg and the laminated plate of the prepreg do not have satisfactory formativeness to conform to the mold, a step of preheating laminated plate to soften it is required in advance.

From this point of view, weaving the carbon fibers and the thermoplastic resin fibers while blending them as in Patent Document 2 can save the above-described time and trouble and solve the problem of handling in the molding. However, flatness of the carbon fibers is lost during the weaving while blending, which not only reduces strength of the carbon fibers but also impairs design of the carbon fiber reinforced plastic after the molding.

The present invention has been researched and developed in order to solve the above-described problems and its object is to provide a fabric for a carbon fiber reinforced composite material, a manufacturing process of which is simplified, ease of handling of which in molding is improved, and which is excellent in strength and design. It is another object of the invention to provide a method of manufacturing a fabric for a carbon fiber reinforced composite material, which is easier and more excellent in production efficiency than conventional methods.

Solutions to the Problems

In order to solve the above-described problems, a fabric for a carbon fiber reinforced composite material according to one aspect of the present invention is formed by partially binding a front texture, in which warp threads and weft threads are carbon fibers, and a back texture, in which warp threads and weft threads are thermoplastic resin fibers so that the front texture and the back texture are integrated with each other.

In this way, the front texture, in which the warp threads and the weft threads are the carbon fibers, and the back texture, in which the warp threads and the weft threads are thermoplastic resin fibers, are connected at binding points and the front texture and the back texture become integral with each other when fused to each other, which keeps flatness of the carbon fibers. Therefore, a resultant molded article has a beautiful external appearance and is excellent in design.

Here, the front texture and the back texture may be plain-woven textures or the front texture and the back texture may be twill 2/2 woven textures.

A method of manufacturing a fabric for a carbon fiber reinforced composite material according to another aspect of the invention includes the steps of weaving a front texture with warp threads and weft threads which are carbon fibers and a back texture with warp threads and weft threads which are thermoplastic resin fibers and partially weaving the carbon fibers in the front texture and the thermoplastic resin fibers in the back texture into each other to bind the front texture and the back texture to obtain an integrated bound dual-layered fabric.

In this way, it is possible to omit the conventional step of forming the prepreg to thereby achieve enhancement of production efficiency.

Effects of the Invention

In the fabric for the carbon fiber reinforced composite material according to the one aspect of the present invention, the front texture, in which the warp threads and the weft threads are formed by the carbon fibers, and the back texture, in which the warp threads and the weft threads are formed by the thermoplastic resin fibers, are connected at the binding points and the front texture and the back texture become integral with each other when fused to each other. Therefore, the resultant molded article has the beautiful external appearance and is excellent in design. Moreover, it is possible to obtain carbon fiber reinforced plastic with a constant resin ratio and excellent in impact resistance and mechanical strength, which can be suitably applied to aerospace use, use for automobiles, use for general industries, use for sporting goods, and the like.

With the method for manufacturing the fabric for the carbon fiber reinforced composite material according to the other aspect of the present invention, it is possible to omit the conventional step of forming the prepreg to thereby achieve enhancement of production efficiency and shortening of molding time. Moreover, the fabric for the carbon fiber reinforced composite material, which is manufactured in this manner and in which the carbon fibers and the thermoplastic resin fibers are integrated with each other, does not require preliminary heating. Because the fabric is excellent in followability to a curved face and conformability to a mold, it has improved followability to recessed and protruding portions.

BEST MODES FOR CARRYING OUT THE INVENTION

An embodiment of the present invention will be described below.

The embodiment of the invention will be described based on the accompanying drawings. A fabric for a carbon fiber reinforced composite material according to the invention is formed by a carbon fiber fabric and a thermoplastic resin fiber fabric and is a fabric for a reinforced composite material formed by melting only thermoplastic resin fibers, impregnating carbon fibers with the thermoplastic resin fibers, and bringing them into close contact and integrating them with each other.

Figure 1:
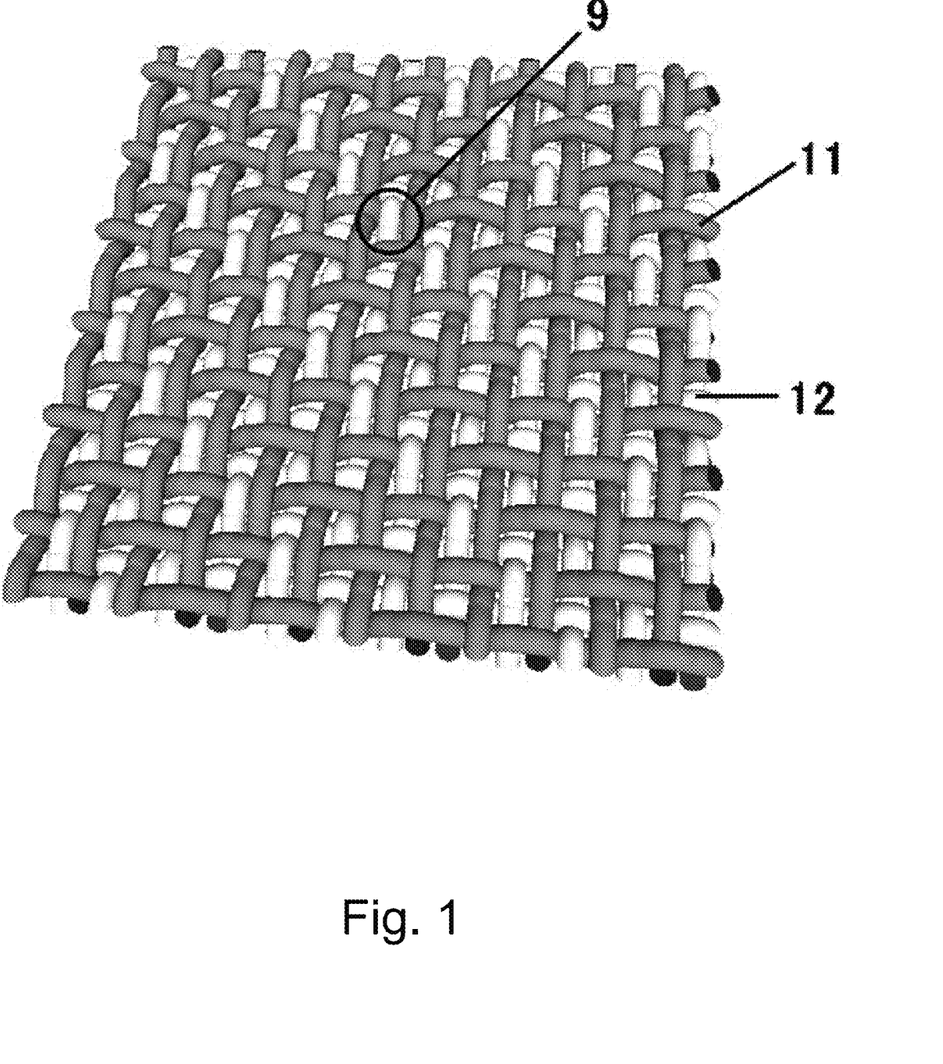
FIG. 1 is a diagram showing structure of a fabric for a carbon fiber reinforced composite material according to Example 1 of the present invention.
Figure 2:
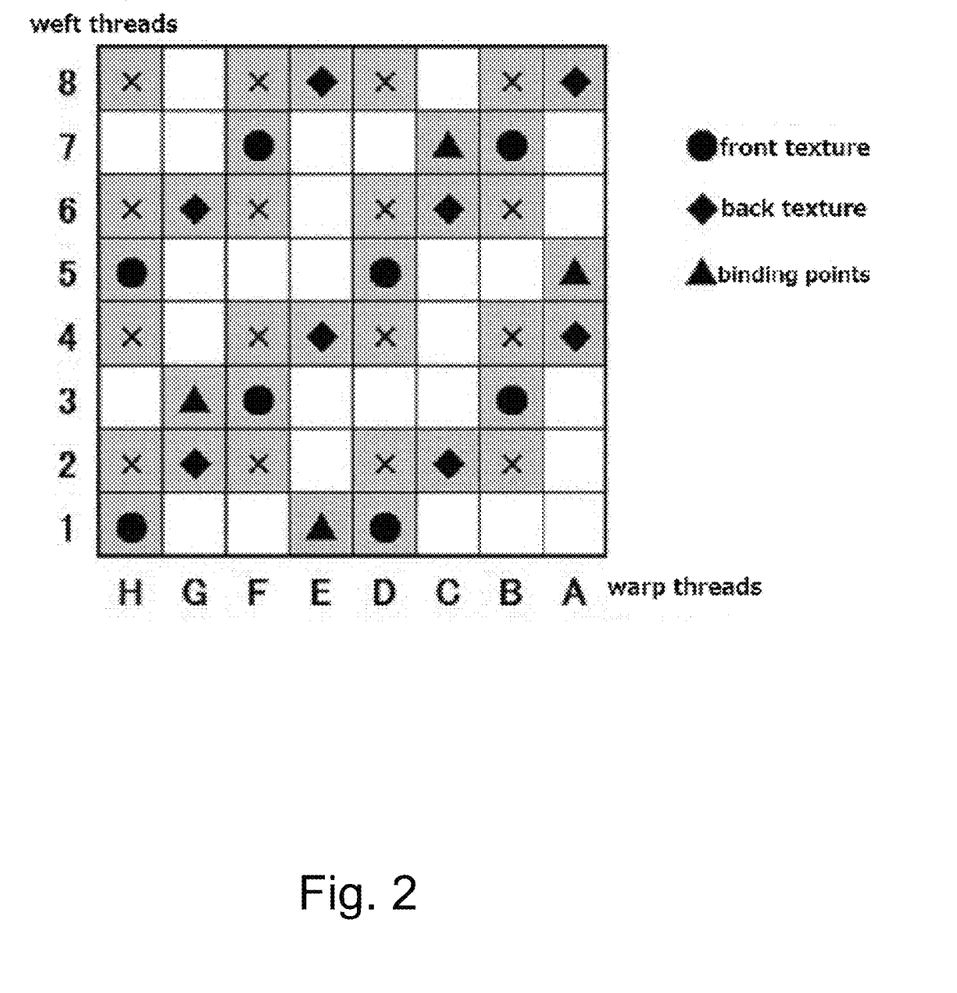
FIG. 2 is a texture diagram of the fabric for the carbon fiber reinforced composite material in Example 1.
Figure 3:
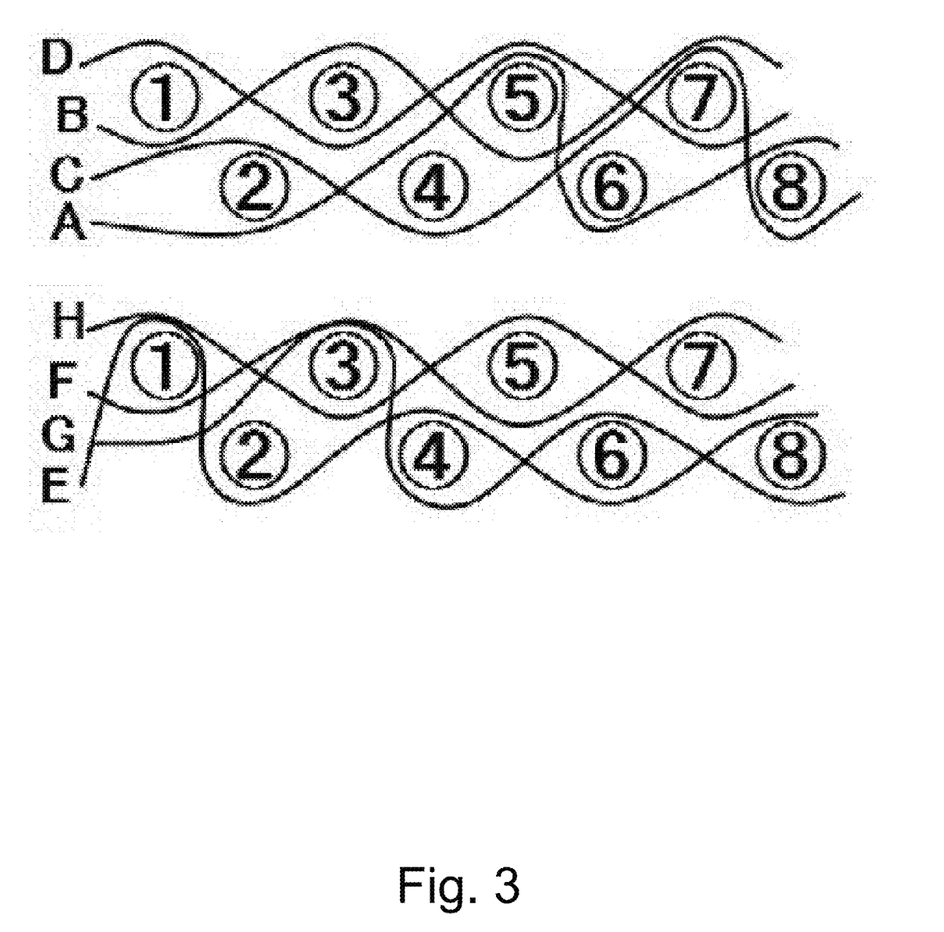
FIG. 3 is a sectional view of the fabric for the carbon fiber reinforced composite material in Example 1.

In other words, the fabric in the invention is a bound dual-layered fabric 13 in which the carbon fibers are used as warp threads B, D, F, and H and weft threads 1, 3, 5, and 7 to form a plain-woven texture as a front texture 11, thermoplastic resin fibers are used as warp threads A, C, E, and G and weft threads 2, 4, 6, and 8 to form a plain-woven texture as a back texture 12, and the weft threads 1, 3, 5, and 7 in the front texture 11 and the warp threads A, C, E, and G of the back texture 12 are woven into each other to form binding points 9 to integrate the front texture 11 and the back texture 12 with each other.

As the carbon fibers used here, both of PAN-based carbon fibers and pitch-based carbon fibers can be used. However, the PAN-based carbon fibers are suitable especially for lightweight structure.

The carbon fiber is normally formed by 500 to 60,000 filaments and preferably by 1,000 to 24,000 filaments.

Next, as the thermoplastic resin fibers used here, any kind of thermoplastic resin fibers can be used. For example, it is possible to use one kind of resin selected from polyamide resin such as nylon 6, polyolefin resin, polyvinyl resin, polyester resin, polyether resin, fluorine resin, and the like. Among them, nylon is for general purpose use and easily available and therefore used for trial production.

The front texture 11 in the invention may be the plain-woven texture in which each of warp threads or weft threads made of carbon fibers is interlaced with each of the weft threads or the warp threads, may be a twill 2/2 woven texture in which each of warp threads or weft threads go alternately over and under two of the weft threads or the warp threads, or may be a sateen-woven texture. Although the front texture 11 is not limited to a specific texture, it is preferably the plain-woven texture from a viewpoint of shape stability. Similarly to the front texture 11, the back texture 12 may be the plain-woven texture, a twill 2/2 woven texture, or a sateen-woven texture formed by the warp threads and the weft threads made of thermoplastic resin fibers.

Points where the front texture 11 and the back texture 12 are bound are preferably 1 to 10% of interlaced points of the warp and weft threads of the weave texture. The binding points 9 fewer than 1% are not preferable, because, in this case, the front texture 11 and the back texture 12 cannot be bound sufficiently and the front texture 11 and the back texture 12 become more liable to be separated from each other during processing. 10% or more binding points 9 are not preferable either, because, in this case, the binding points 9 are conspicuous against the front texture 11, which may impair design of an external appearance. Therefore, the proportion preferably falls within the above-described range.

Next, the fabric for the carbon fiber reinforced composite material in the invention can be manufactured by the method described below. In other words, the bound dual-layered fabric 13 formed by the front texture 11 and the back texture 12 is formed, in which the front texture 11 is formed as the plain-woven texture by using the carbon fibers for both of the warp threads and the weft threads while the back texture 12 is formed as the plain-woven texture by using the thermoplastic resin fibers for both of the warp threads and the weft threads.

EXAMPLES

Example 1

A bound dual-layered fabric 13 is formed by forming a front texture 11 with a plain-woven texture by using carbon fiber threads having 3,000 filaments and a fineness of 200 tex as warp threads B, D, F, and H and weft threads 1, 3, 5, and 7, forming a back texture 12 with a plain-woven texture by using nylon 6 threads with a melting point in a range of 215 to 220° C. and a fineness of 1,400 dtex as warp threads A, C, E, and G and weft threads 2, 4, 6, and 8, and integrating the front texture 11 and the back texture 12 with each other by binding them at four binding points 9, 9, 9, 9 where the weft threads 1, 3, 5, and 7 in the front texture 11 and the warp threads A, C, E, and G of the back texture 12 are woven into each other. By heating and pressurizing the bound dual-layered fabric 13 formed by integrating the front texture 11 and the back texture 12 with each other at 270° C. for three minutes and at a pressure of 4 Mpa, the warp threads A, C, E, and G and the weft threads 2, 4, 6, and 8 made of nylon 6 are melted and brought into close contact and integrated with the carbon fibers. The obtained fabric for the carbon fiber reinforced composite material is excellent in design with the plain-woven texture formed by the carbon fibers appearing on a front face.

Example 2

Figure 4:
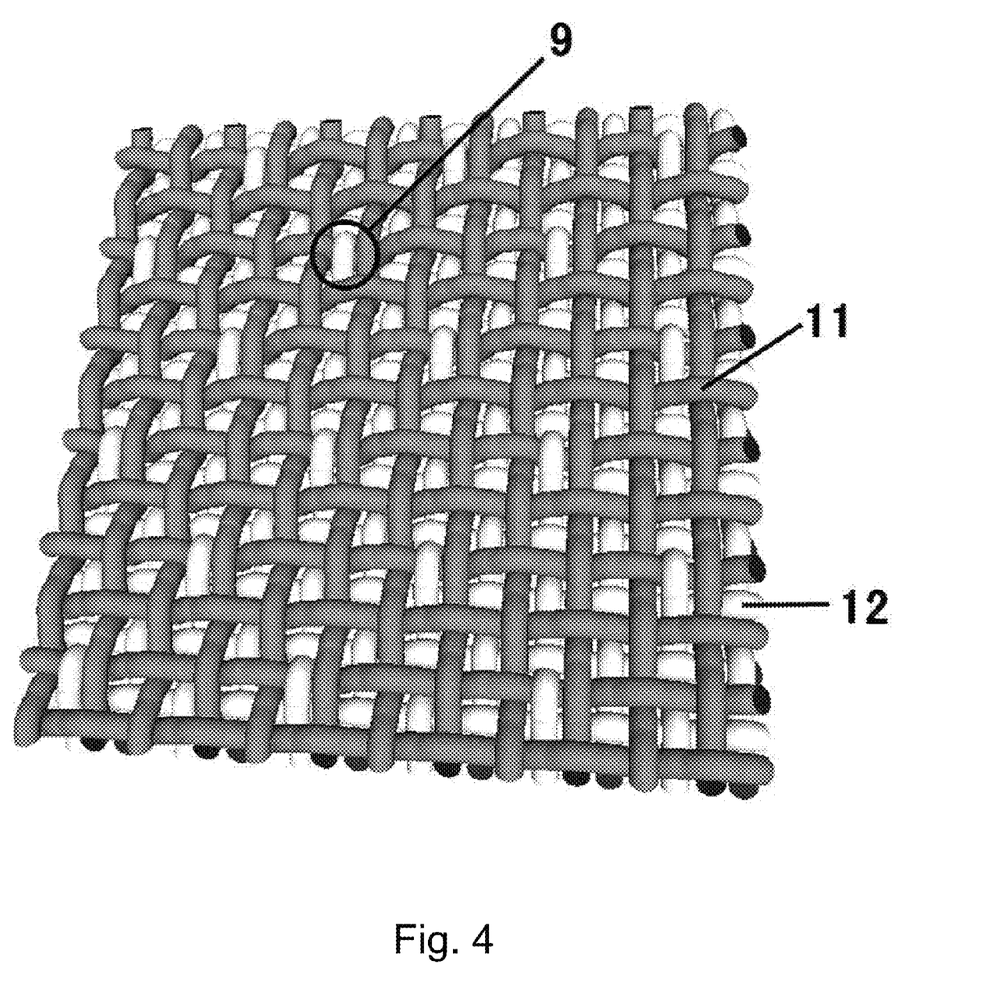
FIG. 4 is a diagram showing structure of a fabric for a carbon fiber reinforced composite material according to Example 2.
Figure 5:
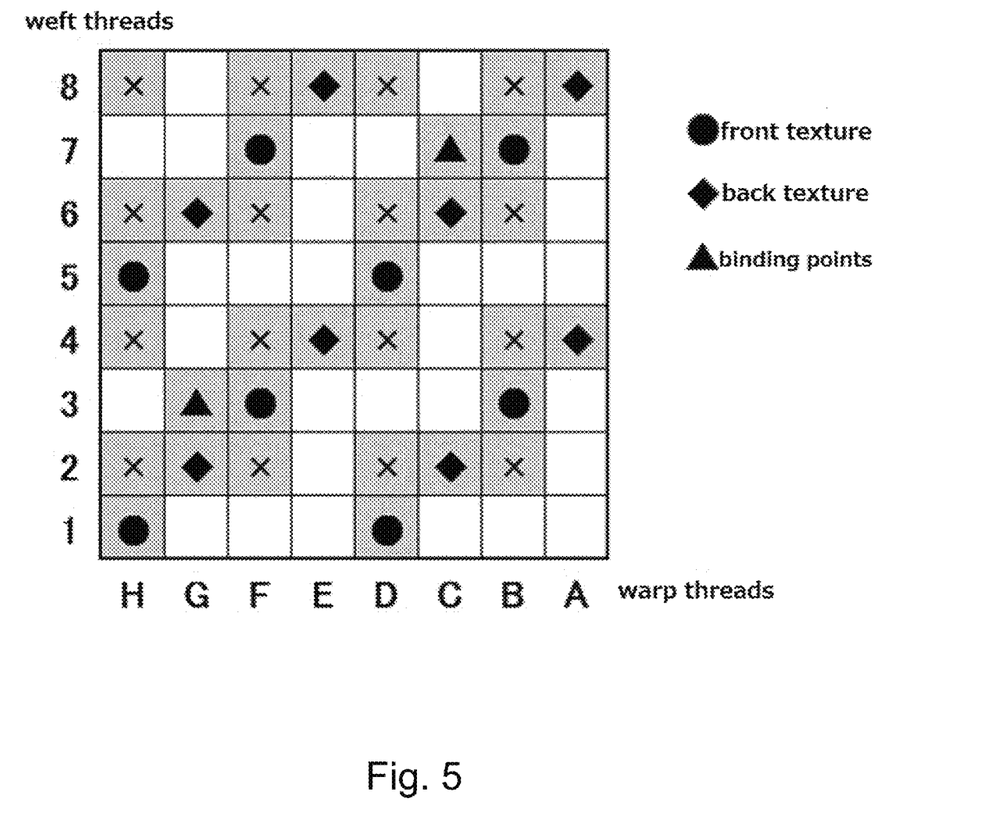
FIG. 5 is a texture diagram of the fabric for the carbon fiber reinforced composite material in Example 2.
Figure 6:
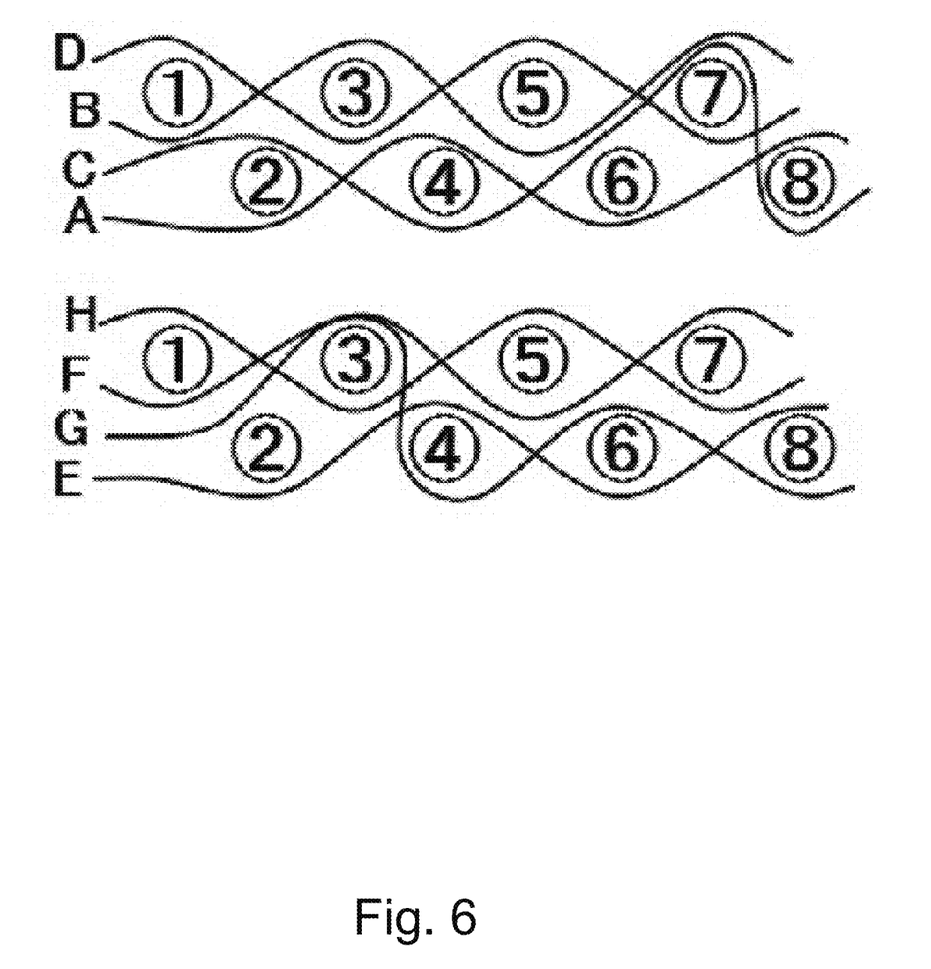
FIG. 6 is a sectional view of the fabric for the carbon fiber reinforced composite material in Example 2.

Although a proportion of the bounding points 9 for integrating the front texture 11 and the back texture 12 with each other is 4/64 in Example 1, a proportion of the binding points 9 is reduced to 2/64 in Example 2. Because Example 2 is exactly the same as Example 1 in other respects, the same portions will be provided with the same reference signs and will not be described. The fabric for the carbon fiber reinforced composite material obtained in this manner is excellent in design with the plain-woven texture formed by the carbon fibers appearing on a front face and the less conspicuous binding points 9 due to reduced binding crimps. This reduction in the crimp rate leads not only to increase in strength of the fabric for the carbon fiber reinforced composite material but also to reduction in thickness of the fabric for the carbon reinforced composite material to thereby increase a specific strength.

Example 3

Figure 7:
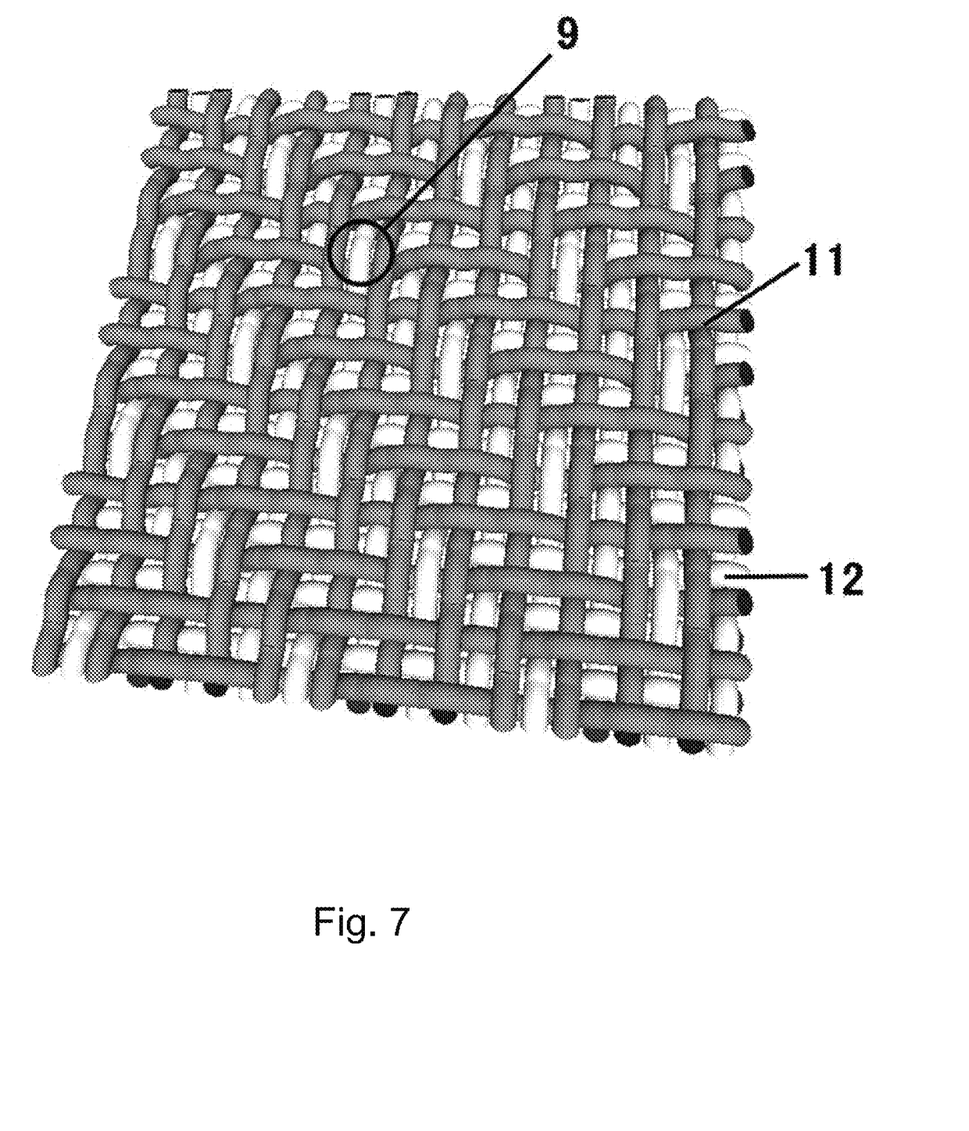
FIG. 7 is a diagram showing structure of a fabric for a carbon fiber reinforced composite material according to Example 3.
Figure 8:
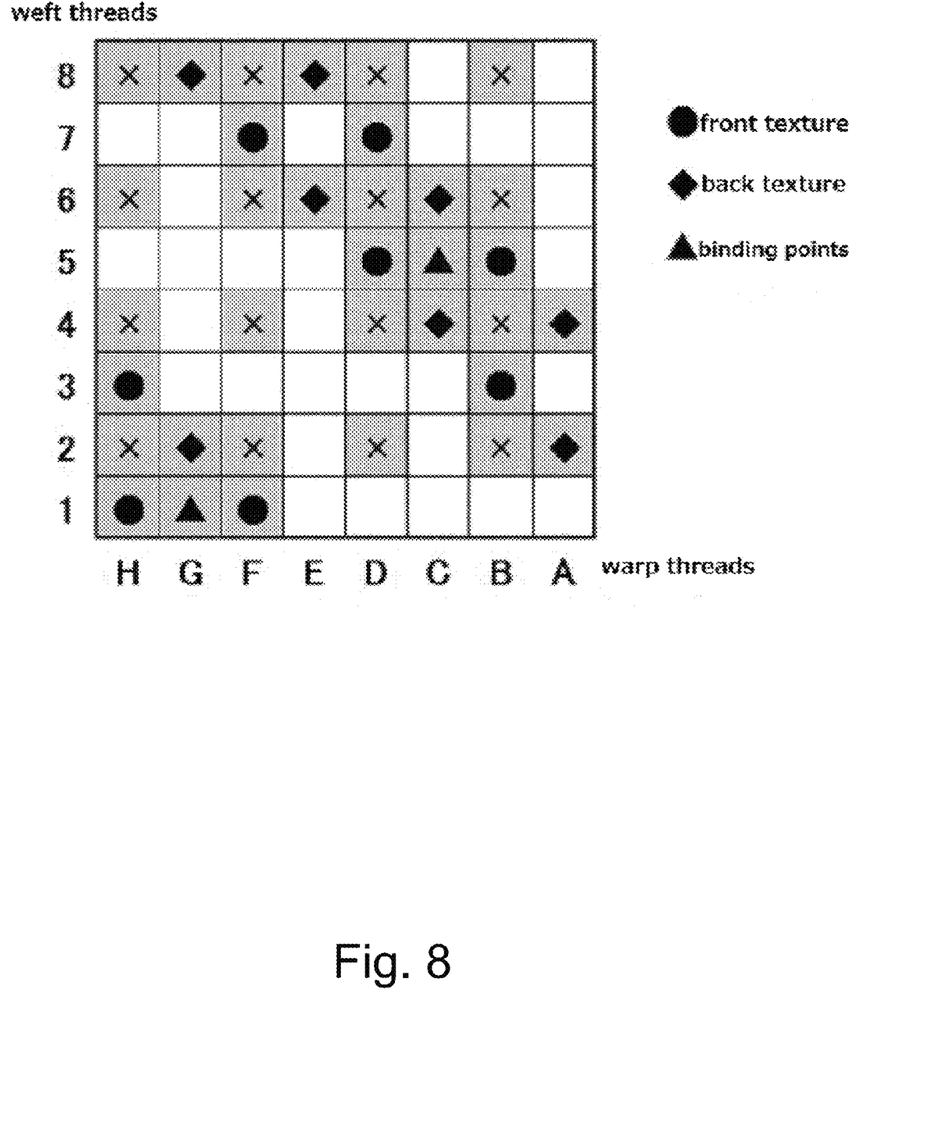
FIG. 8 is a texture diagram of the fabric for the carbon fiber reinforced composite material in Example 3.
Figure 9:
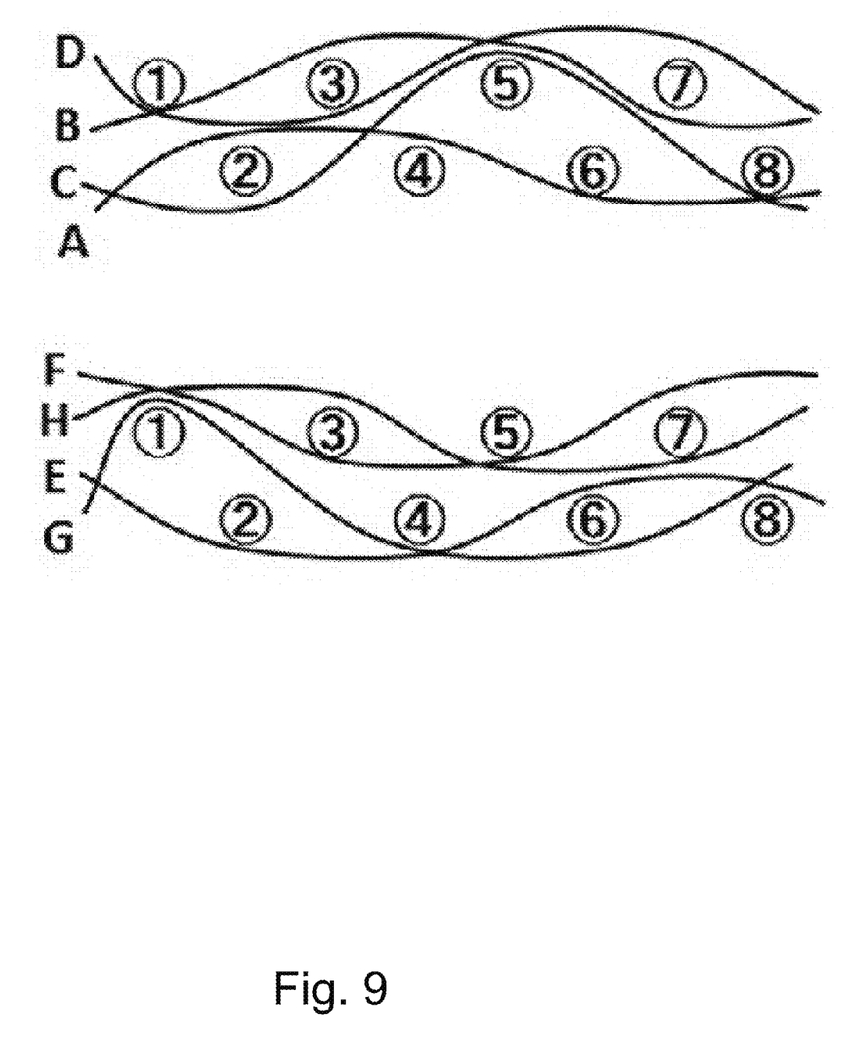
FIG. 9 is a sectional view of the fabric for the carbon fiber reinforced composite material in Example 3.

Although the bound dual-layered fabric 13 is formed by the front texture 11 and the back texture 12 which are the plain-woven textures in each of Examples 1 and 2, both of a front texture 11 and a back texture 12 are twill 2/2 woven textures and a proportion of binding points is 2/64 in Example 3. Because Example 3 is exactly the same as Example 1 in other respects, the same portions will be provided with the same reference signs and will not be described. A fabric for a carbon fiber reinforced composite material obtained in this manner is excellent in design with the twill 2/2 woven texture appearing on a front face.

Although the woven textures on the front face and the back face of the bound dual-layered fabric are plain-woven textures or the twill-woven textures in each of the examples of the invention, the woven textures are not limited to them. The woven textures may be the sateen-woven textures or multi-layered textures including two or more layers may be employed and it is possible to achieve the object of the invention in both the cases. Moreover, it is needless to say that the invention can be changed in design in various ways without departing from the gist of the invention.

INDUSTRIAL APPLICABILITY

The fabric for the carbon fiber reinforced composite material according to the present invention can be suitably used as a material for reinforcing resin in molding various products and parts in a transportation-related field such as aircrafts, trains, and automobiles, an industrial machinery equipment field, a residential construction field, a general industry field, and the like by using carbon fiber reinforced plastic.

The invention claimed is:
1. A fabric for a carbon fiber reinforced composite material, the fabric formed by partially binding a front texture, in which warp threads and weft threads are carbon fibers, and a back texture, in which warp threads and weft threads are thermoplastic resin fibers, at binding points so that the front texture and the back texture are integrated with each other,
    wherein a quantity of the binding points at which the front texture and the back texture are bound together is in a range of one percent to ten percent of a total quantity of interlaced points between the warp and weft threads of the front and back textures, and
    wherein the binding points are formed by weaving the weft threads of the front texture and the warp threads of the back texture into each other at locations that are adjacent and subsequent to locations at which the warp threads of the back texture are drawn over the weft threads of the back texture.
2. The fabric for the carbon fiber reinforced composite material according to claim 1, wherein the front texture and the back texture are plain-woven textures.
3. The fabric for the carbon fiber reinforced composite material according to claim 1, wherein the front texture and the back texture are twill 2/2 woven textures.
4. A method of manufacturing a fabric for a carbon fiber reinforced composite material, the method comprising:
    weaving a front texture with warp threads and weft threads which are carbon fibers and a back texture with warp threads and weft threads which are thermoplastic resin fibers in conjunction with partially weaving the carbon fibers in the front texture and the thermoplastic resin fibers in the back texture into each other at binding points to bind the front texture and the back texture to obtain an integrated bound dual-layered fabric, and
    wherein a quantity of the binding points at which the front texture and the back texture are bound together is in a range of one percent to ten percent of a total quantity of interlaced points between the warp and weft threads of the front and back textures, and
    wherein the binding points are formed by weaving the weft threads of the front texture and the warp threads of the back texture into each other at locations that are adjacent and subsequent to locations at which the warp threads of the back texture are drawn over the weft threads of the back texture.

* * * * *